July 25, 1933. W. A. JAICKS 1,919,724
APPARATUS FOR MIXING CONCRETE
Filed June 3, 1931
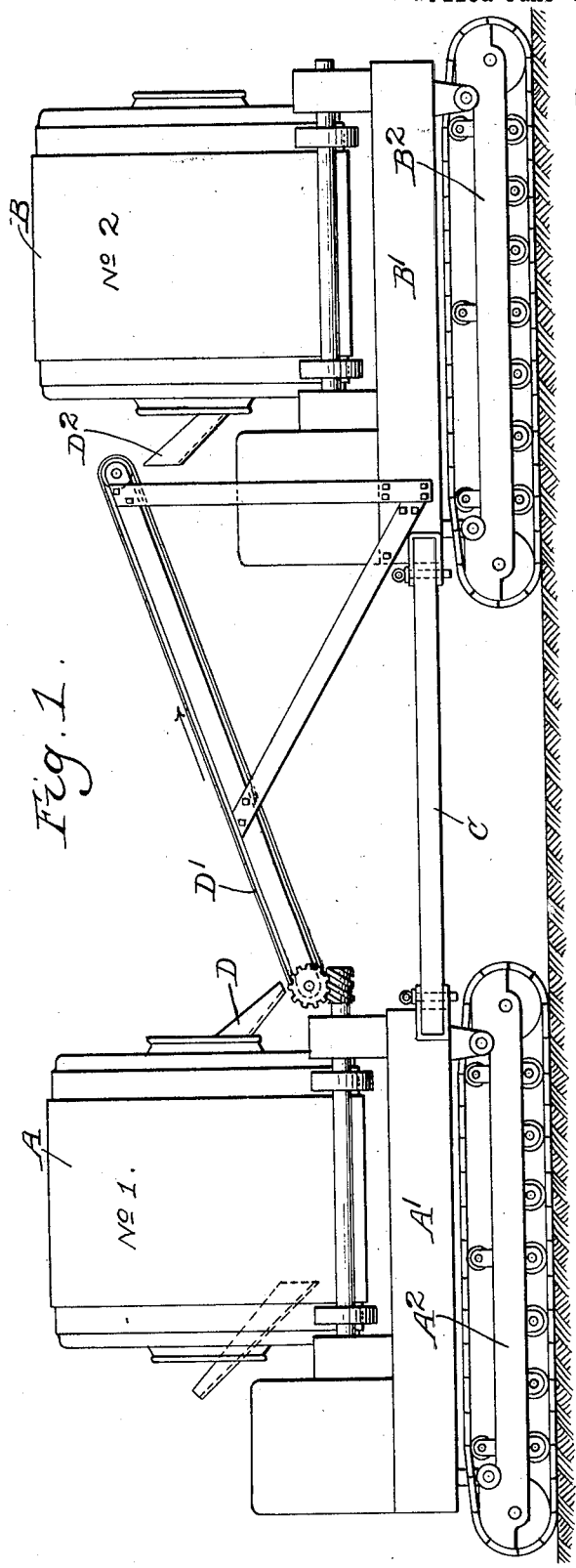
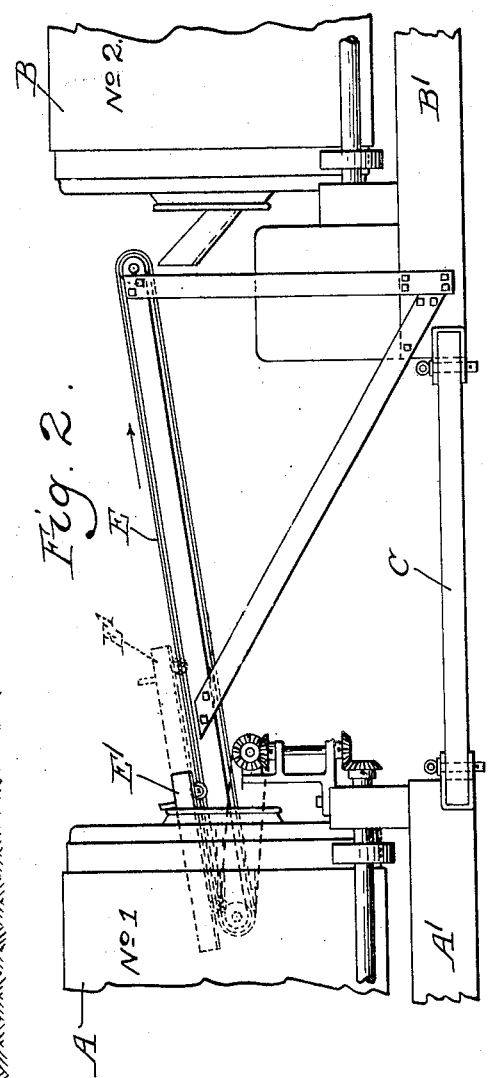
Inventor
Wilson A. Jaicks
by Parker Carter
Attorneys.

Patented July 25, 1933

1,919,724

UNITED STATES PATENT OFFICE

WILSON A. JAICKS, OF CHICAGO, ILLINOIS

APPARATUS FOR MIXING CONCRETE

Application filed June 3, 1931. Serial No. 541,924.

My invention relates to improvements in apparatus for mixing concrete of the same general type as is shown in my co-pending application Ser. No. 523,709 wherein the batch is partially mixed in one mixer, then discharging therefrom in an incompletely mixed condition and thereafter charged into a second mixer which further mixes the concrete and which may thereafter discharge concrete either to another mixer, to a storage or conveying zone or member or directly to the work as the case may be. Other objects will appear from time to time throughout the specification and claims.

My invention is illustrated in the accompanying drawing, wherein—

Figure 1 is a side elevation of the preferred form of my device;

Figure 2 is a partial side elevation similar to Figure 1.

Like parts are indicated by like characters throughout the specification and drawing.

A is the mixer No. 1. It is mounted on a supporting platform $A^1$ which in turn is carried by a crawler tread mechanism $A^2$. A motor not shown is adapted to operate the crawler mechanism and rotate the drum. Material is fed to the drum by any suitable means which supplies batches of properly measured material to the drum, the various elements going in either together or separately and being provided with the requisite amount of water so that the drum may mix a completed batch of material. The drum is adapted to mix the batch of material for less than the correct time of mixing, the balance of the time being made up by mixing in the mixing drum No. 2 shown at B mounted on a platform $B^1$ supported by a crawler tread mechanism $B^2$. Platforms $A^1$ and $B^1$ are joined together by a tie rod C which keeps the two mixing drums in proper working relation. Above the tie rod C and interposed between the two drums is a conveying system preferably taking the form of a belt conveyor. I have shown that conveying system and belt conveyor disposed in a variety of different arrangements. In one instance a pivoted chute D of the usual type catches the material as it is mixed in the drum, discharges it onto the lower discharge end of the belt conveyor $D^1$ which belt conveyor carries the material along an upwardly inclined path where it is discharged into a chute $D^2$ into the mixing drum. In another form, the belt conveyor E projects into the first drum so that if not shielded by the shield $E^1$ movable into and out of register, material will be discharged on the belt conveyor. As long as the shield is in place, material strikes it and slides off into the drum to continue mixing. As soon as the shield is withdrawn, material is discharged directly onto the belt conveyor and by it discharged into mixer No. 2.

Thus in the various modified forms the material being mixed is to a greater or less degree dependent upon the modification preferred, controlled by gravity and by power but in every instance, power is required to convey material from a point in or adjacent one drum to a point in or adjacent the other and in each case there is an arrangement whereby material does not pass directly from one drum to the other. This arrangement is desirable because either by the impacting of the material by gravity or by the manipulating of the material by the propelling and conveying mechanism or by both the concrete is given a certain length of time in which to compact, settle and mix independent of and additional to the mixing effect of the two or more concrete mixing drums.

I claim:

1. A concrete mixing apparatus comprising a plurality of mixing drums spaced one from another, a moving power driven conveyor extending into one of said drums, means interposed between the drum and the conveyor and located within the drum for shielding said conveyor to prevent the deposit of material thereon, said shield being removable to permit material to be deposited by the drum on said conveyor, which conveyor in turn supplies it to the second drum the axes of the two drums being in substantial alignment, the conveyor being adapted to move material positively independent of the effect of gravity from the point where it receives it by gravity from one drum to the point where it discharges it by gravity to the other.

2. A concrete mixing apparatus comprising a plurality of mixing drums spaced one from another, a moving power driven conveyor extending into one of said drums, means interposed between the drum and the conveyor and located within the drum for shielding said conveyor to prevent the deposit of material thereon, said shield being removable to permit material to be deposited by the drum on said conveyor, which conveyor in turn supplies it to the second drum, said conveyor discharged directly into the second drum the axes of the two drums being in substantial alignment, the conveyor being adapted to move material positively independent of the effect of gravity from the point where it receives it by gravity from one drum to the point where it discharges it by gravity to the other.

3. A concrete mixer comprising a plurality of separate mixing drums, separate supporting means for each, tie rods joining said supporting means and maintaining the drums in fixed relation, a moving power driven conveyor system interposed between the drums adapted to receive material partially mixed in one drum, convey it and discharge it into the next drum the axes of the two drums being in substantial alignment, the conveyor being adapted to move material positively independent of the effect of gravity from the point where it receives it by gravity from one drum to the point where it discharges it by gravity to the other.

WILSON A. JAICKS.